United States Patent [19]
Valrey, Sr.

[11] Patent Number: 6,125,570
[45] Date of Patent: Oct. 3, 2000

[54] FISHING ROD HOLDING DEVICE

[76] Inventor: Otis Valrey, Sr., 10640 Pearmain St., Oakland, Calif. 94603

[21] Appl. No.: 09/083,229

[22] Filed: May 21, 1998

[51] Int. Cl.⁷ .................................................. A01K 97/12
[52] U.S. Cl. .................................................................. 43/15
[58] Field of Search ............................................ 43/15, 16

[56] References Cited

U.S. PATENT DOCUMENTS

| | | | |
|---|---|---|---|
| 2,618,090 | 11/1952 | Kimura | 43/15 |
| 2,642,690 | 6/1953 | Soenksen | 43/15 |
| 2,703,465 | 3/1955 | Stefano | 43/15 |
| 2,784,516 | 3/1957 | Barnes | 43/16 |
| 2,944,361 | 7/1960 | Coulter | 43/16 |
| 2,964,868 | 12/1960 | Bennett | 43/15 |
| 3,914,894 | 10/1975 | Kobza | 43/15 |
| 4,231,178 | 11/1980 | Black | 43/16 |
| 4,235,035 | 11/1980 | Guthrie | 43/15 |
| 5,359,802 | 11/1994 | Gutierrez | 43/16 |

*Primary Examiner*—Kurt Rowan

[57] ABSTRACT

A new fishing rod holding device for holding a fishing rod while fishing. The inventive device includes an elongate post with a sleeve for holding a fishing rod pivotally coupled to the upper end of the post. The sleeve has a hook extending from it. A guide arm is coupled to the post. A catch is pivotally coupled to the mounting post and is positioned adjacent the guide arm.

5 Claims, 2 Drawing Sheets

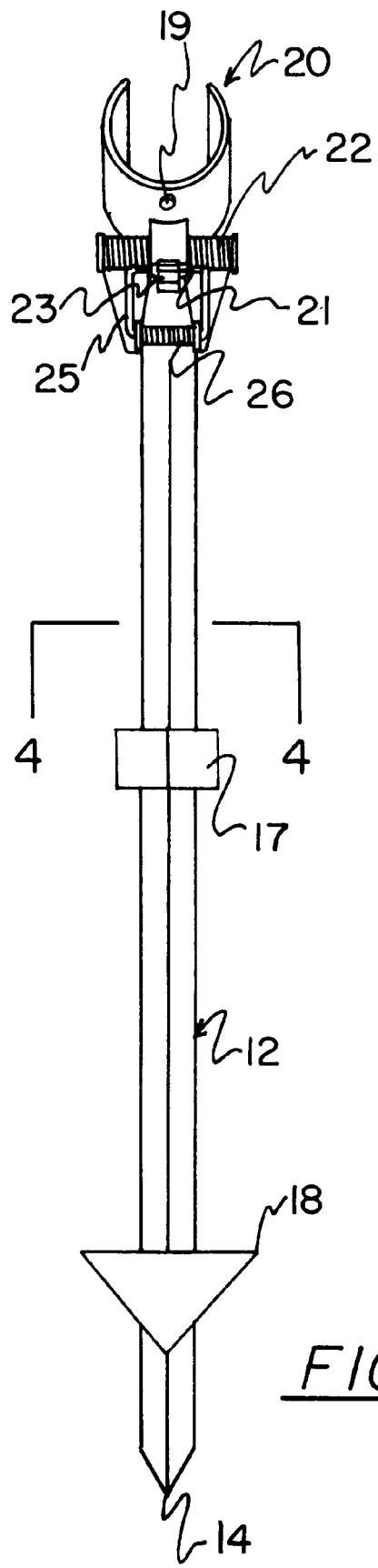
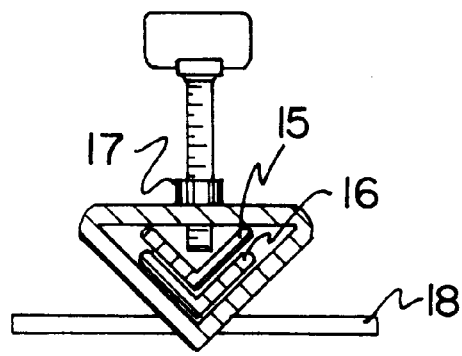
FIG. 3
FIG. 4

FISHING ROD HOLDING DEVICE

BACKGROUND OF THE INVENTION

1. Field of the Invention

The present invention relates to fishing rod holding devices and more particularly pertains to a new fishing rod holding device for holding a fishing rod while fishing.

2. Description of the Prior Art

The use of fishing rod holding devices is known in the prior art. More specifically, fishing rod holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rod holding devices include U.S. Pat. No. 3,154,875; U.S. Pat. No. 3,914,894; U.S. Pat. No. 5,542,205; U.S. Pat. No. 4,550,519; U.S. Pat. No. Des. 342,301; and U.S. Pat. No. 3,205,606.

While these devices fulfill their respective, particular objectives and requirements, the aforementioned patents do not disclose a new fishing rod holding device. The inventive device includes an elongate post with a sleeve for holding a fishing rod pivotally coupled to the upper end of the post. The sleeve has a hook extending from it. A guide arm is coupled to the post. A catch is pivotally coupled to the mounting post and is positioned adjacent the guide arm.

In these respects, the fishing rod holding device according to the present invention substantially departs from the conventional concepts and designs of the prior art, and in so doing provides an apparatus primarily developed for the purpose of holding a fishing rod while fishing.

SUMMARY OF THE INVENTION

In view of the foregoing disadvantages inherent in the known types of fishing rod holding devices now present in the prior art, the present invention provides a new fishing rod holding device construction wherein the same can be utilized for holding a fishing rod while fishing.

The general purpose of the present invention, which will be described subsequently in greater detail, is to provide a new fishing rod holding device apparatus and method which has many of the advantages of the fishing rod holding devices mentioned heretofore and many novel features that result in a new fishing rod holding device which is not anticipated, rendered obvious, suggested, or even implied by any of the prior art fishing rod holding devices, either alone or in any combination thereof.

To attain this, the present invention generally comprises an elongate post with a sleeve for holding a fishing rod pivotally coupled to the upper end of the post. The sleeve has a hook extending from it. A guide arm is coupled to the post. A catch is pivotally coupled to the mounting post and is positioned adjacent the guide arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing rod holding device apparatus and method which has many of the advantages of the fishing rod holding devices mentioned heretofore and many novel features that result in a new fishing rod holding device which is not anticipated, rendered obvious, suggested, or even implied by any of the prior art fishing rod holding devices, either alone or in any combination thereof.

It is another object of the present invention to provide a new fishing rod holding device which may be easily and efficiently manufactured and marketed.

It is a further object of the present invention to provide a new fishing rod holding device which is of a durable and reliable construction.

An even further object of the present invention is to provide a new fishing rod holding device which is susceptible of a low cost of manufacture with regard to both materials and labor, and which accordingly is then susceptible of low prices of sale to the consuming public, thereby making such fishing rod holding device economically available to the buying public.

Still yet another object of the present invention is to provide a new fishing rod holding device which provides in the apparatuses and methods of the prior art some of the advantages thereof, while simultaneously overcoming some of the disadvantages normally associated therewith.

Still another object of the present invention is to provide a new fishing rod holding device for holding a fishing rod while fishing.

Yet another object of the present invention is to provide a new fishing rod holding device which includes an elongate post with a sleeve for holding a fishing rod pivotally coupled to the upper end of the post. The sleeve has a hook extending from it. A guide arm is coupled to the post. A catch is pivotally coupled to the mounting post and is positioned adjacent the guide arm.

Still yet another object of the present invention is to provide a new fishing rod holding device that set the hook into a fish when the fish bites on the line of the fishing rod held by the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic front side view of the present invention.

FIG. 4 is a schematic sectional view of the present invention taken from line 4—4 of FIG. 3.

DESCRIPTION OF THE PREFERRED EMBODIMENT

Figure 1:
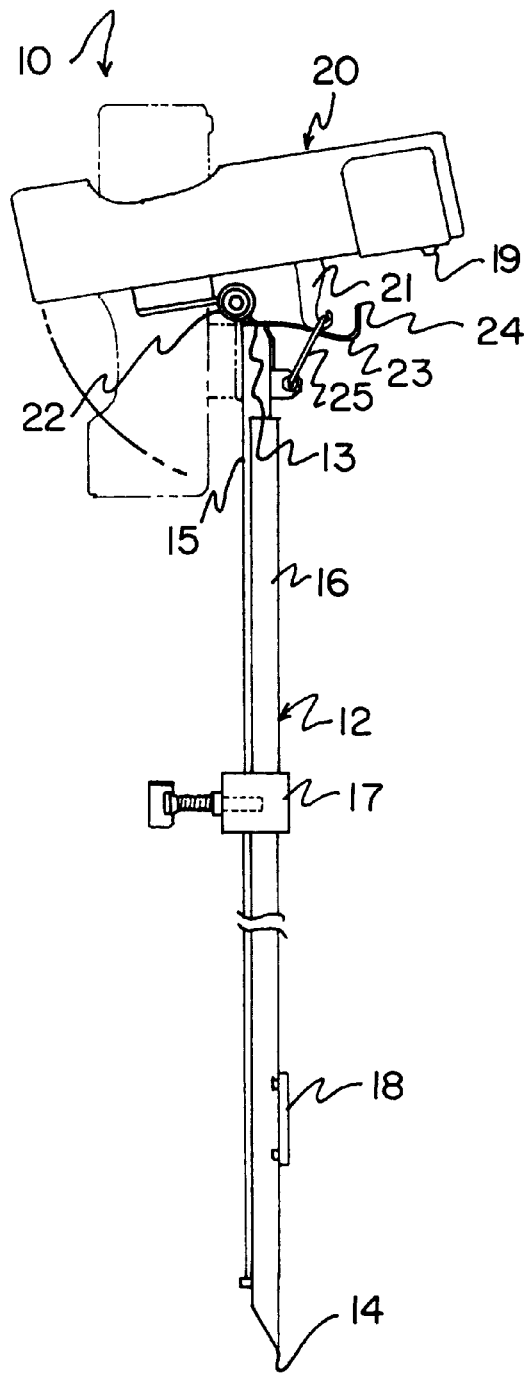
FIG. 1 is a schematic side view of a new fishing rod holding device according to the present invention.

With reference now to the drawings, and in particular to FIGS. 1 through 4 thereof, a new fishing rod holding device embodying the principles and concepts of the present invention and generally designated by the reference numeral 10 will be described.

As best illustrated in FIGS. 1 through 4, the fishing rod holding device 10 generally comprises an elongate post 12 with a sleeve 20 for holding a fishing rod pivotally coupled to the upper end 13 of the post 12. The sleeve 20 has a hook 21 extending from it. A guide arm 23 is coupled to the post 12. A catch 25 is pivotally coupled to the mounting post 12 and is positioned adjacent the guide arm 23.

In closer detail, the elongate post 12 is telescopically extendable and has upper and lower ends 13,14, and a longitudinal axis. The post 12 preferably has a generally V-shaped cross section and upper and lower portions 15,16 with a mounting clamp 17 releasably coupling the upper portion 15 of the post 12 to the lower portion 16 of the post 12. Preferably, the lower end 14 of the post 12 tapers to a point. The lower end 14 of the post 12 is designed for insertion into a ground surface such that the longitudinal axis preferably extends generally vertical from the ground surface. In the preferred embodiment, an generally triangular anti-rotational flange 18 is coupled to the post 12. The anti-rotational flange 18 is positioned towards the lower end 14 of the post 12. The anti-rotational flange 18 is designed for helping prevent rotation of the post 12 when the lower end 14 of the post 12 is inserted into a ground surface.

A sleeve 20 is pivotally coupled to the upper end 13 of the post 12. The sleeve 20 is designed for holding the handle of a fishing rod therein. Preferably, the sleeve 20 has a holding screw 19 for securely holding a fishing rod therein. The sleeve 20 has a hook 21 outwardly extending from it generally perpendicular to the longitudinal axis of the sleeve 20. With reference to FIG. 1, the sleeve 20 is pivotable between first and second positions. The longitudinal axis of the sleeve 20 is generally parallel with the longitudinal axis of the post 12 when the sleeve 20 is in the first position. When the sleeve 20 is in the second position, the longitudinal axis of the sleeve 20 is generally perpendicular to the longitudinal axis of the post 12. The sleeve 20 is biased towards the first position, preferably, by a first spring 22.

A guide arm 23 is coupled to the post 12. The guide arm 23 is generally L-shaped and has a free end 24. The guide arm 23 is outwardly extended from the upper end 13 of the post 12 in a direction generally perpendicular to the longitudinal axis of the post 12. When the sleeve 20 is pivoted towards the second position such that the hook 21 abuts the guide arm 23, the hook 21 of the sleeve 20 is position adjacent the guide arm 23.

Figure 2:
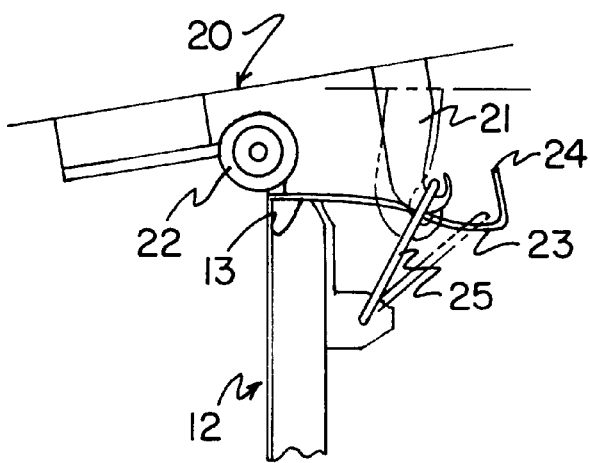
FIG. 2 is a schematic side view of the hook and catch mechanism of the present invention.

The catch 25 is generally U-shaped and has a pair of spaced apart arms and a cross bar extending between the arms of the catch 25. The arms of the catch 25 are pivotally coupled to the mounting post 12. The catch 25 is positioned adjacent the guide arm 23 such that the guide arm 23 extends through the space between the arms of the catch 25. With reference to FIG. 2, the catch 25 is pivotable between a primary position and a secondary position. When the catch 25 is pivoted towards the primary position, the cross bar of the catch 25 is positioned towards the free end 24 of the guide arm 23. The cross bar of the catch 25 is positioned towards the mounting post 12 when the catch 25 is pivoted towards the secondary position. The catch 25 is biased towards the primary position, preferably by a second spring 26.

In use, the hook 21 is engagable to the cross bar of the catch 25 when the sleeve 20 is pivoted towards the second position and the catch 25 is pivoted towards the secondary position such that the hook 21 and catch 25 hold the sleeve 20 in the second position. As illustrated in FIG. 2, when a fish pulls on the fishing line of a rod held in the sleeve, the front end of the sleeve 20 is pulled down. This disengages the hook 21 from the cross bar of the catch 25 so that the catch 25 pivots back to the primary position and the sleeve 20 pivots back towards the first position. This action thereby pulls on the fishing line to set the hook 21 in the fish.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A device for holding a fishing rod, said device comprising:

an elongate post having upper and lower ends, and a longitudinal axis;

a sleeve for holding a fishing rod therein, said sleeve being pivotally coupled to said upper end of said post; said sleeve having a longitudinal axis and a hook extending therefrom;

said sleeve being pivotable between a first and second positions, said longitudinal axis of said sleeve being generally parallel with said longitudinal axis of said post when said sleeve is in said first position, said longitudinal axis of said sleeve being generally perpendicular to said longitudinal axis of said post when said sleeve is in said second position;

said sleeve being biased towards said first position;

a guide arm being coupled to said post, said guide arm having a free end, said guide arm being outwardly extended from said upper end of said post;

said hook of said sleeve being positioned adjacent said guide arm when said sleeve is pivoted towards said second position;

a catch being generally U-shaped and having a pair of spaced apart arms and a cross bar extending between said arms of said catch, said arms of said catch being pivotally coupled to said mounting post, said catch being positioned adjacent said guide arm such that said guide arm extends through the space between said arms of said catch;

said catch being pivotable between a primary position and a secondary position, said catch being positioned towards said free end of said guide arm when said catch is pivoted towards said primary position, said catch being positioned towards said mounting post when said catch is pivoted towards said secondary position;

said catch being biased towards said primary wherein a first spring biases said sleeve towards said first position, and wherein a second spring biases said catch towards said primary position, wherein said first spring is perpendicular to said longitudinal axis of said sleeve, position;

wherein said hook is engagable to said catch when said sleeve is pivoted towards said second position and said catch is pivoted towards said secondary position such that said hook and catch hold said sleeve in said second position.

2. The device of claim 1, wherein said post is telescopically extendable and having upper and lower portions, and wherein a mounting clamp releasably couples said upper portion of said post to said lower portion of said post.

3. The device of claim 1, wherein said post has a generally V-shaped cross section taken perpendicular to said longitudinal axis of said post.

4. The device of claim 1, wherein an anti-rotational flange is coupled to said post, said anti-rotational flange being positioned towards said lower end of said post.

5. A device for holding a fishing rod, said device comprising:

an elongate post being telescopically extendable and having upper and lower ends, and a longitudinal axis;

said post having a generally V-shaped cross section and upper and lower portions, wherein a mounting clamp releasably couples said upper portion of said post to said lower portion of said post;

said lower end of said post tapering to a point;

an anti-rotational flange being coupled to said post, said anti-rotational flange being positioned towards said lower end of said post;

a sleeve being pivotally coupled to said upper end of said post, said sleeve being for holding a fishing rod therein;

said sleeve having a longitudinal axis and a hook extending therefrom;

said sleeve being pivotable between a first and second positions, said longitudinal axis of said sleeve being generally parallel with said longitudinal axis of said post when said sleeve is in said first position, said longitudinal axis of said sleeve being generally perpendicular to said longitudinal axis of said post when said sleeve is in said second position;

said sleeve being biased towards said first position, wherein a first spring biases said sleeve towards said first position;

a guide arm being coupled to said post, said guide arm being generally L-shaped and having a free end, said guide arm being outwardly extended from said upper end of said post;

said hook of said sleeve being position adjacent said guide arm when said sleeve is pivoted towards said second position;

a catch being generally U-shaped and having a pair of spaced apart arms and a cross bar extending between said arms of said catch, said arms of said catch being pivotally coupled to said mounting post, said catch being positioned adjacent said guide arm such that said guide arm extends through the space between said arms of said catch;

said catch being pivotable between a primary position and a secondary position, said cross bar of said catch being positioned towards said free end of said guide arm when said catch is pivoted towards said primary position, said cross bar of said catch being positioned towards said mounting post when said catch is pivoted towards said secondary position;

said catch being biased towards said primary position, wherein a second spring biases said catch towards said primary position; and wherein said hook is engagable to said cross bar of said catch when said sleeve is pivoted towards said second position and said catch is pivoted towards said secondary position such that said hook and catch hold said sleeve in said second position.

* * * * *